UNITED STATES PATENT OFFICE.

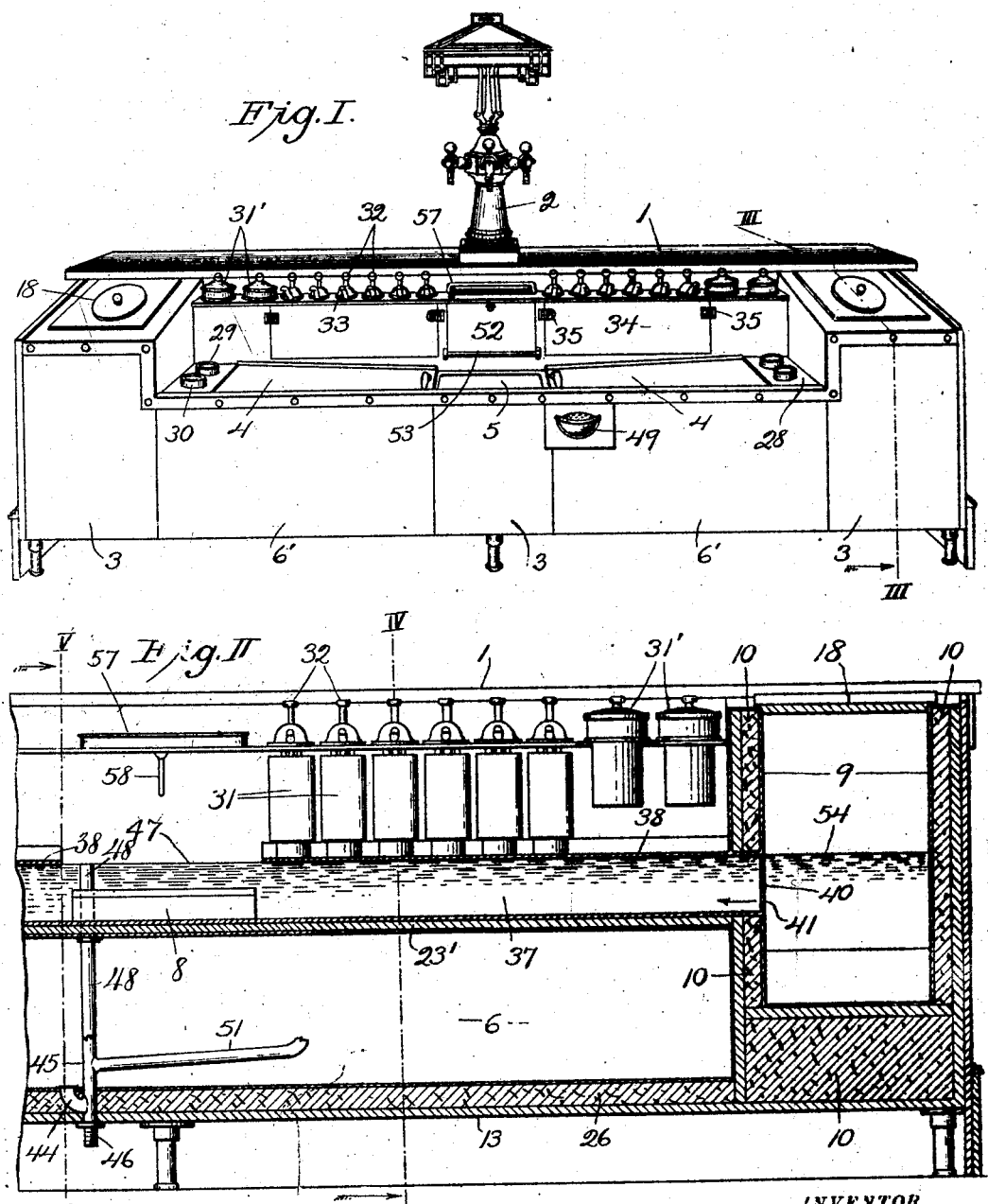
E. R. GLENN.
SODA FOUNTAIN.
APPLICATION FILED APR. 4, 1910.
1,027,472.
Patented May 28, 1912.
2 SHEETS—SHEET 1.

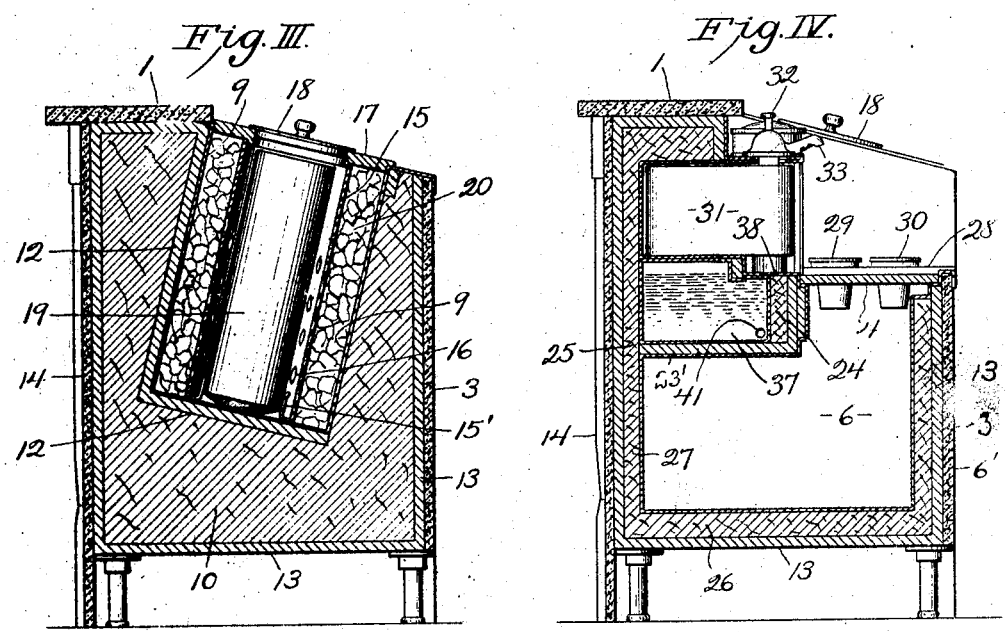
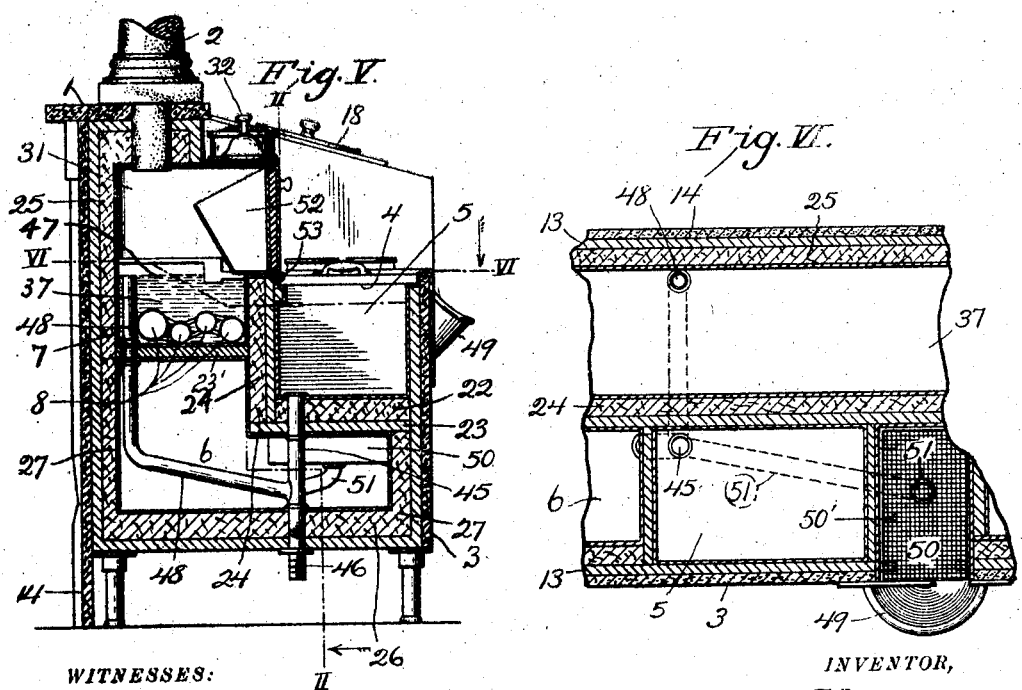

EDMOND R. GLENN, OF KANSAS CITY, MISSOURI, ASSIGNOR TO WESTERN CABINET AND FIXTURE MANUFACTURING COMPANY, OF KANSAS CITY, MISSOURI, A CORPORATION OF MISSOURI.

SODA-FOUNTAIN.

1,027,472.  Specification of Letters Patent.  Patented May 28, 1912.

Application filed April 4, 1910. Serial No. 553,360.

*To all whom it may concern:*

Be it known that I, EDMOND R. GLENN, a citizen of the United States, residing at Kansas City, in the county of Jackson and State of Missouri, have invented certain new and useful Improvements in Soda-Fountains; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to "soda fountains" or apparatus for storing, cooling and dispensing soda water, other drinks, and ice cream, and has for its principal object to provide an apparatus of this character wherein brine from the salted ice delivered in the ice cream tubs may be used as a refrigerating agent for cooling the syrups and "soda" water.

A further object is to provide other improved combinations, arrangements, and constructions of parts, preferred forms of which are hereinafter described, claimed, and illustrated in the accompanying drawings.

A valuable economy attaches to the use of my novel cooling system, which consists in provision of suitable means for the utilization of the salted ice in which each can of ice cream is packed when delivered to the fountain. In this apparatus the salted ice from the tubs is packed about the ice-cream can packers surrounding the ice-cream cans and serves its usual purpose in the apparatus, but the brine which is produced by the melting of such ice is utilized in the apparatus for the additional purpose mentioned.

In the accompanying drawings, Figure I is a rear perspective view of an apparatus constructed according to my invention, the various chambers thereof being closed. Fig. II is a vertical longitudinal section of a portion of the apparatus, on the line II—II of Fig. V, the syrup jars being in elevation. Fig. III is a vertical section through one of the ice cream chambers, on the line III—III of Fig. I. Fig. IV is a vertical sectional view on the line IV—IV of Fig. II, showing also the front of the structure. Fig. V is a vertical sectional view on the line V—V of Fig. II, showing also the front of the structure. Fig. VI is a horizontal sectional view on the line VI—VI of Fig. V, broken away.

Referring more in detail to the parts:—
In Fig. I, 1 designates the slab upon which the drinks are served; 2, the draft stand; 3, the rear walls of the ice cream chambers; and 4, two slidable work-boards, arranged at the sides of the sink, 5, which is located at the rear of the fountain. At the respective sides of the sink 5 are two cold storage compartments, 6, which have the rear walls 6' and have communication with each other beneath the sink, as shown. For clearness of illustration, the tubes leading to and from this cooler are omitted.

9 designates the ice holders, which are forwardly inclined and consist of sheet metal receptacles, embedded in some suitable heat insulating material, as, "Nonpareil cork" or the like, 10, which is separated from the vessel at the front and bottom by the wooden lagging 12. The mass of cork is inclosed in a wooden box or cabinet 13, which is covered by the marble slabs 1, 3 and 14. Fixed within each of said holders 9, and of lesser diameter, is an ice cream packer 15, which is preferably of sheet metal and provided with numerous apertures 16 through which the brine may pass from the surrounding annular space 20 formed by the ice holder and packer.

Located in the bottom of the packer are the spring clamp fingers 15' for centering and holding the ice cream can 19 therein away from the packer so as to provide an annular brine reservoir surrounding the ice cream can. Closing the packer, at the top, is a lid 18, which projects through an opening in the annular cover 17 of the holder 9. In practice, the space 20 is to be filled with the salted ice which is delivered in a tub along with the ice-cream by the purveyor thereof and the cold brine therefrom passes through the apertures 16 in the packer and surrounds the ice-cream can 19.

As shown in Fig. V, the sink 5 is provided with a sub-layer of cork 22, which rests upon a horizontal partition 23. Between the sink and the soda cooler tank 7 is a cork partition 24, and the entire front and bottom of the apparatus are lined with sheet metal and interlined with layers of cork, designated 25 and 26. The rear walls of the cold storage compartments 6 are also lined with cork 27, as seen in Figs. IV and V. By the term cork is meant, of course, any equivalent material, for protecting the contained parts from the higher temperature of the outside air. At the end of each work-board 4 is a plate or shelf 28, having openings adapted to hold therein a spoon holder 29 and a disher holder 30.

31 designates the syrup jars, and 32, the syrup pumps mounted thereon, said pumps having the faucets 33. The rows of syrup jars are covered rearwardly by metallic doors 34, having latches 35 whereby they are held in position. 31' designates fruit jars which are conveniently located as illustrated in the drawings.

Between the ice-cream compartments at the front of the fountain, and above the horizontal front partition 23', is a brine tank 37, which I preferably construct with sheet metal sides, bottom and tops, the top plates 38 providing the bottom plates of the jar supporting frames being so located that the bottoms of the syrup jars 31 rest thereon, as shown. In the brine tank 37 is a soda cooler 8, of ordinary construction, connected by tubes not shown with the draft stand and the supply. This cooler may be placed in whatever part of the tank will impart the desired coldness to the soda. A drain pipe 45 descends from the bottom of the sink 5 and ends in a sewer connection 46. At the normal level of the brine 47 in tank 37 flush with the under surface of the top plates 38 of the tank 37, is the upper end of an overflow pipe 48, which passes downward, then rearwardly to connect with pipe 45. At one side of the sink is a slop chute 49 which opens into a tank 50, from the bottom of which a drain pipe 51 leads to and connects with pipe 45. Within tank 50 is a wire basket 50' which prevents lemon and orange peel, etc., from clogging the drain pipe 51.

52 designates my improved chipped-ice holder, shown in section in Fig. V and rear elevation in Fig. I. This holder is mounted on a hinge 53 at the bottom thereof, and stays in its closed position by gravity. When chipped ice is required, the attendant grasps the knob thereof and tilts the holder outwardly.

The operation of the brine 54, which is formed by the melting salt ice, will be readily understood, by reference to Fig. II. The brine in each vessel 9 passes through orifice 41 in the end 40 of the adjacent brine tank 37 into the tank, cooling the syrup jars 31, and overflows through the pipe 48 into the pipe 45. The level of the brine in this tank is kept at a certain height so as to be constantly in contact with the under surface of the top plates 38 of the tank forming the bottom plates of the jar supporting frames by the overflow pipe 48, and as ice is constantly melting around the ice-cream cans, there will be a flow of cold brine through the tank 37 against the under surface of the top plates 38, between the inner ends of the top plates 38 and into the overflow pipe 48. The soda cooler 8, being always submerged in the cold brine, cools the "carbonated" water which is conducted into the draft stand by a tube, not shown.

Having thus described my invention, what I claim as new therein and desire to secure by Letters-Patent is:—

1. In a soda fountain comprising a salted ice holder, an apertured ice cream can packer located in the holder and spaced therefrom so as to provide a salted ice reservoir between the holder and the apertured packer and having spring clamping fingers for centering and spacing the ice cream can away from the apertured packer.

2. A soda fountain comprising a salted ice holder, a brine tank in communication with the holder, a top plate for the tank providing a bottom plate for a jar supporting frame, and an overflow pipe having its top flush with the under surface of the top plate so as to cause the brine from the holder to contact with the under surface of the top plate, for cooling the latter as the brine passes from the holder to the overflow pipe.

In testimony whereof I affix my signature in presence of two witnesses.

EDMOND R. GLENN.

Witnesses:
MYRTLE M. JACKSON,
E. A. CAHILL.